United States Patent [19]

Habermeier et al.

[11] 3,882,137

[45] May 6, 1975

[54] BIS-HYDANTOIN DIALCOHOLS

[75] Inventors: Juergen Habermeier, Allschwil; Hans Batzer, Arlesheim; Daniel Porret, Binningen, all of Switzerland

[73] Assignee: Ciba-Geigy Corporation, Ardsley, N.Y.

[22] Filed: June 13, 1972

[21] Appl. No.: 262,423

Related U.S. Application Data

[63] Continuation-in-part of Ser. No. 80,493, Oct. 13, 1970, Pat. No. 3,726,895.

[30] Foreign Application Priority Data

Nov. 18, 1969  Switzerland.................. 17105/69

[52] U.S. Cl. ............................................ 260/309.5
[51] Int. Cl............................................... C07d 49/32
[58] Field of Search ................................ 260/309.5

[56] References Cited
UNITED STATES PATENTS

| | | | |
|---|---|---|---|
| 3,391,097 | 7/1968 | Williamson | 260/309.5 |
| 3,449,353 | 6/1969 | Porret et al. | 260/309.5 |
| 3,542,803 | 11/1970 | Porret | 260/309.5 |
| 3,592,823 | 7/1971 | Porret | 260/309.5 |
| 3,629,263 | 12/1971 | Batzer et al. | 260/309.5 |

Primary Examiner—Natalie Trousof
Attorney, Agent, or Firm—Vincent J. Cavalieri

[57] ABSTRACT

Dialcohols of dinuclear, five-membered or six membered, unsubstituted or substituted N-heterocyclic compounds which contains two NH-groups in the molecule are prepared by reacting dinuclear, five-membered or six-membered, unsubstituted or substituted N-heterocyclic compounds, for example bis-(hydantoin)- or bis-(dihydrouracil) compounds, with styrene oxide to give dialcohols. A preferable class of hydantoin alcohols are those having the formula:

(a)

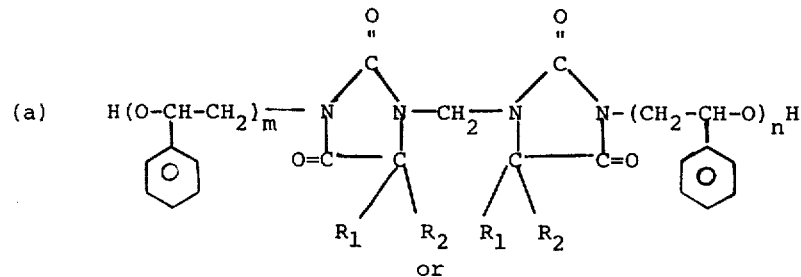

or (b)

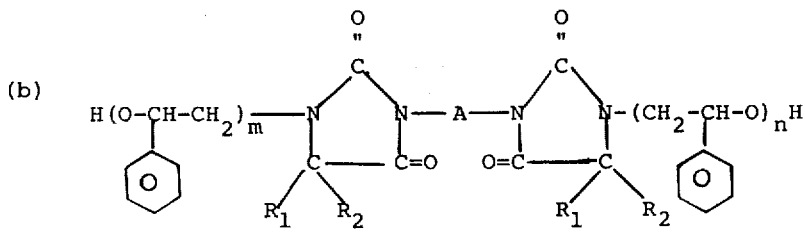

wherein $R_1$ and $R_2$ is hydrogen, alkyl of 1 to 5 carbon atoms, or wherein $R_1$ and $R_2$ is tetramethylene or pentamethylene, and A is an alkylene of 1 to 12 carbon atoms or lower alkylene interrupted by one oxygen atom; and m and n each represents an integer having a value of 1 to 30. These compounds are useful as intermediates for the preparation of diglycidyl compounds. The preparation and use of the diglycidyl compounds is described in Offenlegungsschrift 2,056,789 which issued May 27, 1971.

6 Claims, No Drawings

BIS-HYDANTOIN DIALCOHOLS

This application is a continuation in part application of our copending application Ser. No. 80,493, filed Oct. 13, 1970, now U.S. Pat. No. 3,726,895.

The subject of the present invention are new dialcohols of the general formula

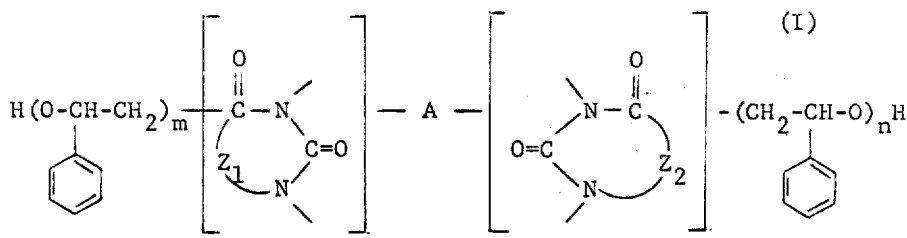

wherein $Z_1$ and $Z_2$ independently of one another each denotes a nitrogen-free divalent radical which is necessary to complete a five-membered or six-membered, unsubstituted or substituted heterocyclic ring, A represents a divalent aliphatic, cycloaliphatic or araliphatic radical, and in particular preferably represents an alkylene radical or an alkylene radical which is interrupted by oxygen atoms and m and n each represent an integer having a value of 1 to 30, preferably of 1 to 4.

The radical Z in the formula (I) preferably only consists of carbon and hydrogen or of carbon, hydrogen and oxygen. It can for example be a radical of formulae

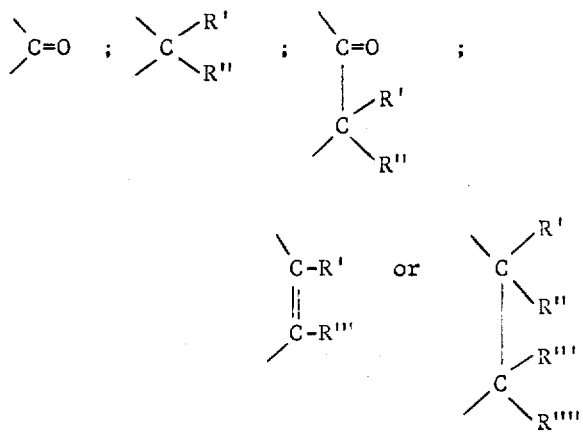

wherein R', R'', R''' and R'''' independently of one another each can denote a hydrogen atom or, for example, an alkyl radical, an alkenyl radical, a cycloalkyl radical or an optionally substituted phenyl radical.

The new dialcohols of formula (I) can be manufactured by reacting binuclear N-heterocyclic compounds of general formula

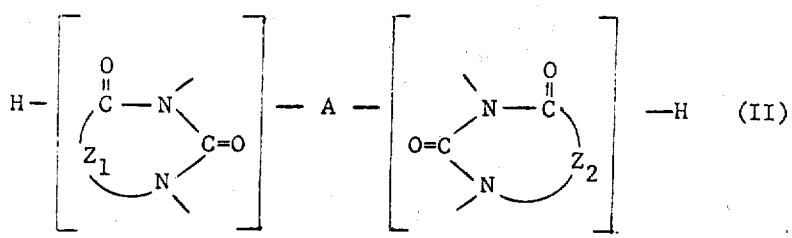

wherein $Z_1$, $Z_2$ and A have the same meaning as in Formula (I), with styrene oxide in the presence of a suitable catalyst.

The addition of styrene oxide to both NH groups of the binuclear N-heterocyclic compounds of formula (II) can be carried out both in the presence of acid catalysts and of alkali catalysts, with a slight excess over the equivalent amount of the styrene oxide being employed per equivalent of NH group of the binuclear N-heterocyclic compound of formula (II).

Preferably, however, alkaline catalysts such as tetramethylammonium chloride or tertiary amines are used in the manufacture of dialcohols of formula (I), in which the sum of m and n is 2. However, alkali halides, such as lithium chloride or sodium chloride, can also be successfully used for this addition reaction; it also takes place without catalysts.

When manufacturing dialcohols of formula (I) in which the sum of m and n is greater than 2, it is preferable to start from the simple dialcohols of formula (I) in which m and n are each 1, with further styrene oxide being added to both OH groups of this compound in the presence of acid catalysts.

The binuclear N-heterocyclic compounds of formula (II) used for the manufacture of the new styrene oxide addition products of formula (I) are above all bis-(hydantoin) compounds or bis-(dihydrouracil) compounds in which the two N-heterocyclic rings are linked to another via an alkylene bridge, for example a methylene group which is bonded to one endocyclic nitrogen atom of each of the heterocyclic rings in question.

A first class of such bis-(hydantoin) compounds corresponds to the general formula

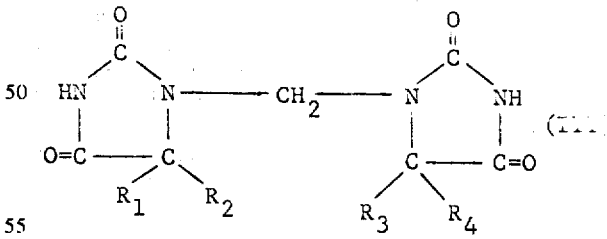

wherein $R_1$, $R_2$, $R_3$ and $R_4$ each denote a hydrogen atom or a lower alkyl radical with 1 to 4 carbon atoms, or wherein $R_1$ and $R_2$ or $R_3$ and $R_4$ together form a tetramethylene or pentamethylene radical.

1,1'-methylene-bis-(5,5-dimethyl-hydantoin), 1,1'-methylene-bis-(5-methyl-5-ethyl-hydantoin), 1,1'-methylene-bis-(5-propyl-hydantoin), 1,1'-methylene-bis-(5-isopropylhydantoin) may for example be mentioned.

another each denote a hydrogen atom or a lower alkyl radical with 1 to 4 carbon atoms.

1,1'-Methylene-bis-(5,6-dihydrouracil), 1,1'-methylene-bis-(6-methyl-5,6-dihydrouracil) and 1,1'-methylene-bis-(5,5-dimethyl-5,6-dihydrouracil) may be mentioned.

As aspect of this invention is as follows:

(a)
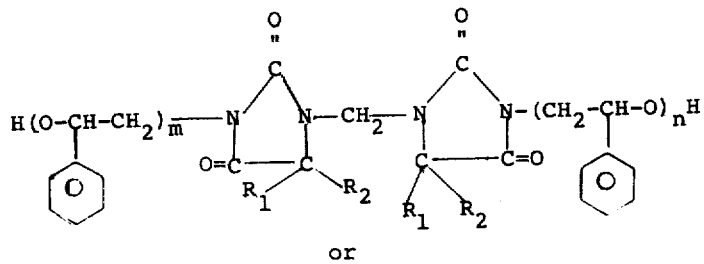

or (b)
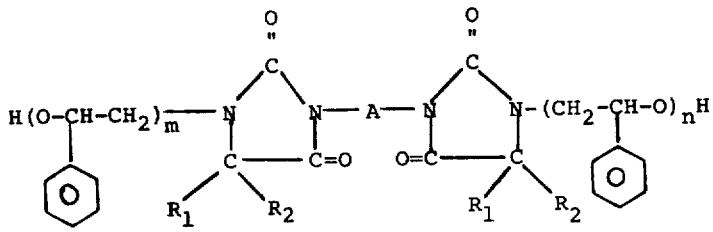

A further class of such bis-(hydantoin) compounds corresponds to the general formula

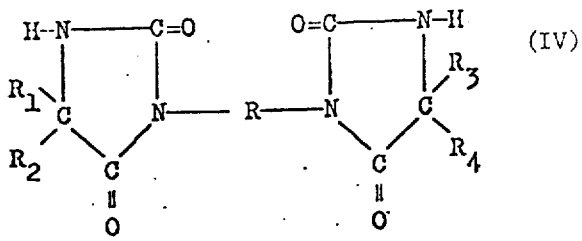
(IV)

wherein R is an aliphatic, cycloaliphatic or araliphatic radical, especially an alkyl radical, or an alkylene radical which is interrupted by oxygen atoms, and $R$, $R_2$, $R_3$ and $R_4$ each denote a hydrogen atom or a lower alkyl radical with 1 to 4 carbon atoms, or wherein $R_1$ and $R_2$, or $R_3$ and $R_4$, together form a tetramethylene or pentamethylene radical. Bis-(5,5-dimethyl-hydantoinyl-3)-methane, 1,2-bis-(5', 5'-dimethyl-hydantoinyl-3')-ethane, 1,4-bis-(5', 5'-dimethyl-hydantoinyl-3')-butane, 1,6-bis-(5', 5'-dimethyl-hydantoinyl-3')-hexane, 1,12-bis-(5', 5'-dimethyl-hydantoinyl-3')-dodecane and β,β'-bis-(5', 5'-dimethyl-hydantoinyl-3')-diethyl-ether may be mentioned.

A preferentially employed class of bis-(dihydrouracil) compounds corresponds to the general formula

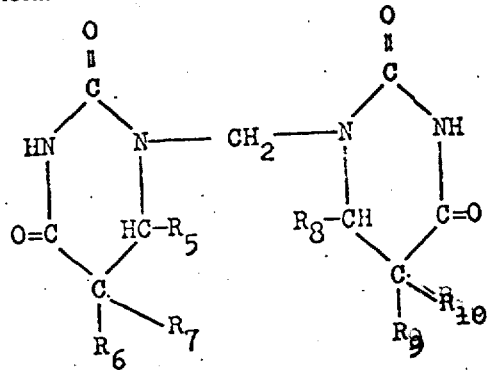
(V)

wherein $R_5$, $R_6$, $R_7$, $R_8$, $R_9$ and $R_{10}$ independently of one wherein $R_1$ and $R_2$ is hydrogen, alkyl of 1 to 5 carbon atoms, or wherein $R_1$ and $R_2$ tetramethylene or pentamethylene; and A is an alkylene of 1 to 12 carbon atoms or lower alkylene interrupted by one oxygen atom; and m and n each represents an integer having a value of 1 to 30. The dialcohols are useful as intermediates for the preparation of diglycidyl compounds. The preparation and use of the diglycidyl compounds are described in Offenlegungsschrift 2,056,789 which issued on May 27, 1971. The diglycidyl ethers can be manufactured by reacting the dialcohols in one stage or several stages, in a manner which is in itself known, with an epihalogenohydrin or β-methylepihalogenohydrin, such as, for example, epichlorohydrin, β-methylepichlorohydrin or epibromhydrin.

In the single stage process, the reaction of epihalogenohydrin with the dialcohols takes place in the presence of of alkali, with sodium hydroxide or potassium hydroxide being preferably used. In this single-stage process, the epichlorohydrin which is reacted according to the process can be wholly or partially replaced by dichlorohydrin, which under the process conditions and on appropriate addition of alkali is transiently converted to epichlorohydrin and then reacted as such with the dialcohol. In the 2-stage process which is preferably used, the dialcohols undergo an addition reaction with an epihalogenohydrin in the presence of acid or basic catalysts to give the halogenohydrin ether and thereafter the latter is dehydrohalogenated in a second stage by means of alkali, such as, potassium hydroxide or sodium hydroxide, to give the glycidyl ether.

Suitable acid catalysts for the 2-stage processes are especially loose acids, such as, for example, $AlCl_3$, $SfCl_5$, $SnCl_4$, $FeCl_3$, $BF_3$, $ZnCl_2$ and their complexes with organic compounds.

The reaction can also be accelerated by the addition of other suitable catalysts, for example, alkali hydroxides, such as, sodium hydroxide, alkali halides, such as, lithium chloride, sodium chloride, bromide and fluoride. The diglycidyl ethers react with the customary curing agents for polyepoxide compounds and can therefore be crosslinked or cured by addition of such curing agents, analogously to other polyfunctional compounds or epoxide resins.

The curable epoxide resin mixtures are employed in the fields of surface protection, the electrical industry, laminating processes and the building industry. It can be used in the formulation suited in each case to the special end use, in the unfilled or filled state, optionally in the form of solutions or emulsions, as paints, laquers, compression molding compositions, sintering powders, dipping resins, casting resins, injection molding formulations, impregnating resins and binders, adhesives, as tooling resins, laminating resins, ceiling and filling compositions, floor covering compositions and binders for mineral aggregates.

EXAMPLE 1

1,1'-Methylene-bis-[3-(β-hydroxy-β-phenylethyl)-5,5-dimethylhydantoin]

267.5 g of styrene oxide are added dropwise at 120°C over the course of 1½ hours, with good stirring, to a solution of 268.25 g of 1,1'-methylene-bis-(5,5-dimethylhydantoin) [1 mol] and 1.3 g of lithium chloride in 1.5 litres of dimethylformamide. Thereafter the mixture was stirred for a further 2 hours at 130°C. The clear, light yellow solution is concentrated at 80°C on a rotary evaporator under a water pump vacuum and is then dried at 85°C/10.1 mm Hg. 512 g of a glossy, transparent body (100% of theory) are obtained. For purification, the substance can be recrystallised from an equal amount of ethanol. The yield of pure product (without working up the mother liquor) is 61% of theory. The 1,1'-methylene-bis-[3-(β-hydroxy-β-phenylethyl)-5,5-dimethylhydantoin] purified in this way melts at 140 – 142°C.

| Elementary analysis shows: | found | calculated |
|---|---|---|
| | 11.06 % N | 11.02 % N |
| | 6.39 % H | 6.34 % H |

The infrared spectrum shows, through the absence of absorptions of the N-H grouping and through the presence of the following bands, that the desired substance has been produced:
3450 cm⁻¹ (OH); 1769 cm⁻¹ and 1708 cm⁻¹ (C=O) and 702 cm⁻¹ (aromatic).

Furthermore, the proton-magnetic resonance spectrum (60 Mc HNMR, recorded in CDCl₃ at 35°C, with tetramethylsilane (TMS) as the standard) shows that the new compound has the structure given below. Integration shows 32 protons (theory: 32).

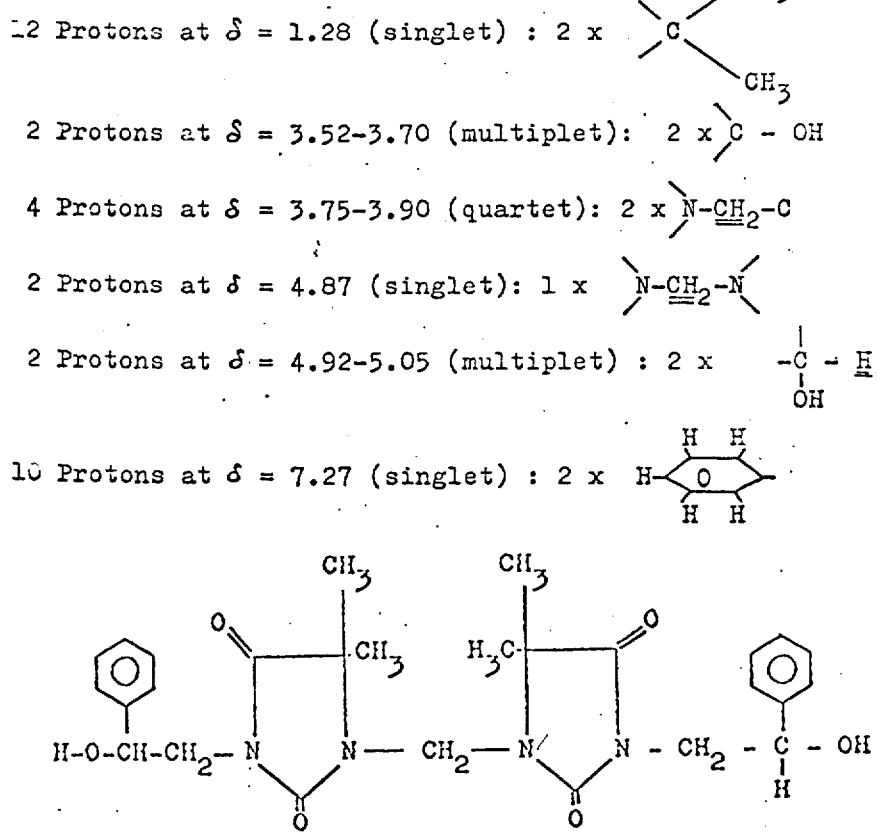

EXAMPLE 2

1,1'-Methylene-bis-[3-(β-hydroxy-β-phenylethyl)-5-isopropylhydantoin]

79.5 g of styrene oxide (0.66 mol) are added dropwise over the course of 2 hours at 127°-131°C, with vigorous stirring, to a mixture of 89 g of 1,1'-methylene-bis-(5-isopropylhydantoin) (0.3 mol), 500 ml of dimethylformamide and 0.37 g of lithium chloride. Thereafter the mixture is stirred for a further 3 hours at 130°C. The pale yellow solution is filtered hot and is subsequently concentrated at 80°C on a rotary evaporator, under 20 mm Hg. The residue is now dried to constant weight at 90°C/0.1 mm Hg. 160.4 g of a viscous, yellow, clear substance are obtained. This corresponds to 99.3 % of theory.

EXAMPLE 3

Addition of styrene oxide to 1,1'-methylene-bis-[3-(β-hydroxy-β-phenylethyl)-5,5-dimethylhydantoin]

45.6 g of the product manufactured according to Example 1 (0.897 mol) are dissolved in 500 ml of anhydrous dioxane. 3.5 ml of a 47 % strength boron fluoride-diethyl etherate solution in diethyl ether are then added and the mixture is warmed to 80°C whilst stirring. 192 g of styrene oxide (1.6 mols) are now added dropwise over the course of 40 minutes. The reaction becomes exothermic; the temperature of the reaction mixture rises to 84°C after the heating bath has been removed. Thereafter the reaction mixture is stirred for a further 2 hours at 90°C, adjusted to a pH of 7.0 (initial value: pH = 3) with the aid of 30 % strength aqueous sodium hydroxide solution, brought to room temperature and filtered. The filtrate is concentrated on a rotary evaporator at 70°C under a water pump vacuum and dried to constant weight at 85°C/0.1 mm Hg. 198 g of a light yellow, viscous substance are obtained. From this yield, the amount of styrene oxide added can be defined as 152.4 g, corresponding to 1.266 mols. Thus approx. 14 molecules of styrene oxide are added per starting molecule.

This is in agreement with combustion analysis. Herein a nitrogen content of 2.4 % is found, the theoretically calculated value being 2.5 % N. The proton-magnetic resonance spectrum (60 Mc H–NMR, recorded in CDCl₃ at 35°C with tetramethylsilane (TMS) as the standard) also confirms these relationships. If the proton number of the signal of the

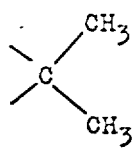

groups (δ=1.27) is compared with the proton number of the signal for the aromatic protons, it is found that 16 styrene oxide molecules are present per 1,1'-methylene-bis-(5,5-dimethylhydantoin) molecule. Thus 14 mols of styrene oxide are added per starting molecule. Accordingly the adduct has the following structure.

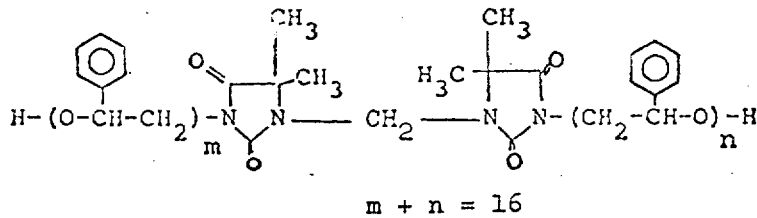

m + n = 16

EXAMPLE 4

2,2'-Bis-[1-(β-hydroxy-β-phenylethyl)-5,5-dimethylhydantoinyl-3]-diethyl ether

A solution of 130.8 g of 2,2'-bis-(5,5-dimethylhydantoinyl-3)-diethyl ether (0.4 mol) in 800 ml of dimethylformamide is treated with 0.5 g of lithium chloride and warmed to 140°C whilst stirring. 106.0 g of styrene oxide (0.66 mol) are added dropwise at this temperature over the course of 3 hours. Thereafter the mixture is stirred for a further 10 hours at 150°C, cooled to 60°C, filtered and concentrated on a rotary evaporator at 60°C/waterpump vacuum; thereafter the material is dried to constant weight at 85°C/0.2 mm Hg.

225.8 g of a light brown, glassy brittle mass are obtained, corresponding to 99.5 % of theory. Combustion analysis shows a nitrogen content of 10.00 % (theory = 10.00 % N). The proton-magnetic resonance spectrum (60 Mc H–NMR, recorded in CDCl₃ at 35°C, internal standard: TMS) is also in agreement with the structure given below, and above all the ratio of the protons at δ = 1.3 to those of δ = 7.3 is 12:10, which also indicates that the reaction takes place quantitatively:

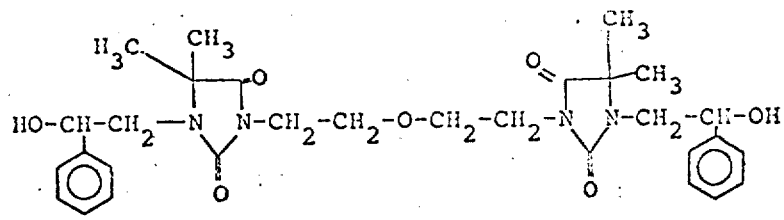

EXAMPLE 5

1,12-Bis-[1'-(β-hydroxy-β-phenylethyl)-5', 5'-dimethylhydantoinyl-3']-dodecane 50.6 g of 1,12-bis-(5', 5'-dimethylhydantoinyl-3')-dodecane (0.12 mol) together with 500 ml of dimethylformamide and 0.2 g of lithium chloride are stirred at 140°C. 31.8 g of styrene oxide (0.265 mol) are added dropwise over the course of 2 hours. Thereafter the mixture is stirred for a further 12 hours at 148°–153°C. Working up is carried out in accordance with Example 4. 79.4 g of a light brown, glassy mass are obtained, corresponding to 99.9% of theory.

We claim:
1. A dialcohol of the formula

(a) 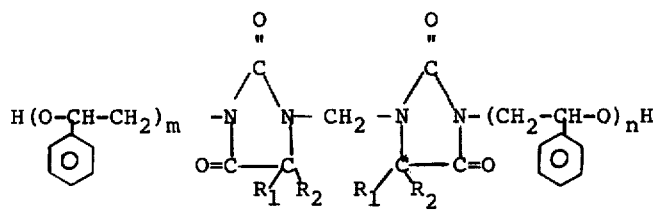

or (b) 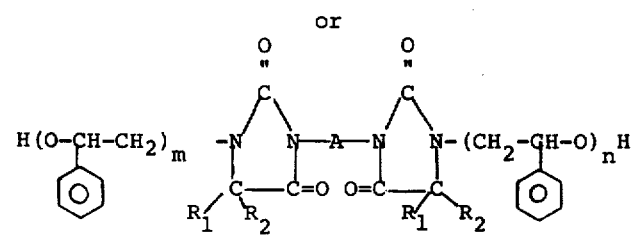

wherein $R_1$ and $R_2$ is hydrogen, alkyl of 1 to 5 carbon atoms, or where $R_1$ and $R_2$ is tetramenthylene or pentamethylene; and A is an alkylene of 1 to 12 carbon atoms or lower alkylene interrupted by one oxygen atom; and m and n each represents an integer having a value of 1 to 30.

2. A compound as claimed in claim 1 wherein *m* and *n* each represents an integer having a value of 1 to 4.

3. A compound as claimed in claim 1 which is 1,1'-methylene-bis-[3-($\beta$-hydroxy-$\beta$-phenylethyl)-5,5-dimethylhydantoin].

4. A compound as claimed in claim 1 which is 1,1'-methylene-bis-[3-($\beta$-hydroxy-$\beta$-phenylethyl)-5-isopropylhydantoin].

5. A compound as claimed in claim 1 which is 2,2'-bis-[1-($\beta$-hydroxy-$\beta$-phenylethyl)-5,5-dimethylhydantoinyl-3]-diethyl ether.

6. A compound as claimed in claim 1 which is 1,12-bis-[1'-($\beta$-hydroxy-$\beta$-phenylethyl)-5,5-dimethylhydantoinyl-3']-dodecane.

* * * * *